(12) United States Patent
Hiniker-Roosa

(10) Patent No.: US 9,727,465 B2
(45) Date of Patent: Aug. 8, 2017

(54) SELF-DISABLING WORKING SET CACHE

(71) Applicant: Microsoft Technology Licensing, LLC, Redmond, WA (US)

(72) Inventor: David J. Hiniker-Roosa, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/253,856

(22) Filed: Apr. 15, 2014

(65) Prior Publication Data
US 2014/0229683 A1    Aug. 14, 2014

Related U.S. Application Data

(62) Division of application No. 13/294,750, filed on Nov. 11, 2011, now Pat. No. 8,700,864.

(51) Int. Cl.
*G06F 12/00* (2006.01)
*G06F 12/0831* (2016.01)
*G06F 12/0864* (2016.01)

(52) U.S. Cl.
CPC ...... *G06F 12/0831* (2013.01); *G06F 12/0864* (2013.01)

(58) Field of Classification Search
CPC .................. G06F 12/0831; G06F 12/0864
See application file for complete search history.

(56) References Cited

U.S. PATENT DOCUMENTS

| 4,382,278 | A | * | 5/1983 | Appelt ................ G06F 12/0875 365/189.17 |
|---|---|---|---|---|
| 5,625,793 | A | | 4/1997 | Mirza |
| 6,981,112 | B2 | | 12/2005 | Christofferson et al. |
| 7,606,976 | B2 | | 10/2009 | Raghuvanshi |
| 7,694,075 | B1 | | 4/2010 | Feekes, Jr. |
| 7,769,955 | B2 | | 8/2010 | Ozer et al. |
| 7,840,848 | B2 | | 11/2010 | Azevedo et al. |
| 7,877,537 | B2 | | 1/2011 | Pesavento et al. |
| 8,291,168 | B2 | | 10/2012 | Wilkerson et al. |
| 8,700,864 | B2 | | 4/2014 | Hiniker-Roosa |
| 2004/0039886 | A1 | | 2/2004 | Christofferson et al. |
| 2006/0112233 | A1 | | 5/2006 | Hu et al. |

(Continued)

OTHER PUBLICATIONS

Friedman, et al., "File Cache Performance and Tuning", Retrieved at <<http://technet.microsoft.com/en-us/library/bb742613.aspx>>, Jan. 2002, pp. 29.

(Continued)

*Primary Examiner* — John A Lane
(74) *Attorney, Agent, or Firm* — Dicke, Billig & Czaja, PLLC

(57) ABSTRACT

A method to monitor the behavior of a working set cache of a full data set at run time and determine whether it provides a performance benefit is disclosed. An effectiveness metric of the working set cache is tracked over a period of time by efficiently computing the amount of physical memory consumption the cache saves and comparing this to a straightforward measure of its overhead. If the effectiveness metric is determined to be on an ineffective side of a selected threshold amount, the working set cache is disabled. The working set cache can be re-enabled in response to a predetermined event.

19 Claims, 4 Drawing Sheets

(56) References Cited

U.S. PATENT DOCUMENTS

| | | |
|---|---|---|
| 2006/0136671 A1 | 6/2006 | Balakrishnan et al. |
| 2009/0037662 A1 | 2/2009 | La Frese et al. |
| 2009/0138658 A1 | 5/2009 | Dreslinski, Jr. et al. |
| 2012/0110270 A1 | 5/2012 | Moyer |
| 2013/0246713 A1 | 9/2013 | Ahmad et al. |

OTHER PUBLICATIONS

"Metadata Caching in HDF5", Retrieved at <<http://www.hdfgroup.org/HDF5/doc/Advanced/MetadataCache/>>, Oct. 5, 2010, pp. 17.

Zhao, et al., "Low Cost Working Set Size Tracking", Retrieved at <<http://www.usenix.org/event/atc11/tech/final_files/Zhao.pdf>>, Retrieved Date: Jul. 18, 2011, pp. 6.

Dhodapkah, et al., "Managing Multi-Configuration Hardware via Dynamic Working Set Analysis", Retrieved at <<http://citeseerx.ist.psu.edu/viewdoc/download?doi=1 0.1.1.73.8775&rep=rep1&type=pdf>>, Proceedings of the 29th Annual International Symposium on Computer Architecture (ISCA), 2002, pp. 12.

Ehcache, "Cache Configuration", Retrieved at <<http://ehcache.org/documentation/configuration.html>>, Retrieved Date: Jul. 18, 2011, pp. 6.

Zhao, et al., "CacheScouts: Fine-Grain Monitoring of Shared Caches in CMP Platforms", Retrieved at <<http://ieeexplore.ieee.org/stamp/stamp.jsp?tp=&arnumber=4336224>>, Proceedings of the 16th International Conference on Parallel Architecture and Compilation Techniques (PACT), Sep. 15-19, 2007, pp. 339-349.

The Notice Allowance for U.S. Appl. No. 13/294,750 mailed Nov. 22, 2013 (15 pgs.).

\* cited by examiner

SELF-DISABLING WORKING SET CACHE

CROSS-REFERENCE TO RELATED APPLICATIONS

This patent application is a divisional of Ser. No. 13/294,750 filed Nov. 11, 2011, entitled "SELF-DISABLING WORKING SET CACHE," which is incorporated herein by reference.

BACKGROUND

A cache is a component that transparently stores data so that future requests for that data can be served faster. Data that is stored within a cache might be values that have been computed earlier or duplicates of original values that are stored elsewhere. If requested data is contained in the cache, which is typically referred to as a cache hit, this request can be served by simply reading the cache. Otherwise, a cache miss occurs, and the data typically has to be recomputed or fetched from its original storage location. Thus, the more requests that can be served from the cache the faster the overall system performance is expected to be. Caches have proven themselves in many areas of computing because access patterns in typical computer applications have locality of reference. References exhibit temporal locality if data is requested again that has been recently requested already. References exhibit spatial locality if data is requested that is physically stored close to data that has been requested already. A common example of a cache is a cache for a central processor, which is disposed in the computer architecture between the processor and the main memory, so that all requests from the processor go through the cache prior to reaching the main memory.

Another example of a cache is a working set cache. A working set is often considered to be the items that occupy physical memory for a process and is typically a subset of its virtual memory. Virtual memory contains all items that can be accessed by a process, and the virtual memory may include a large item referred to as a full data set. A fault occurs when the process attempts to access an item that is in virtual memory, for instance a part of the full data set, but is not already in the working set. In certain cases, such as when a full data set is large or located throughout memory, this can be costly and a working set cache is created to provide a performance benefit. In essence, the working set cache includes a subset of data items from the full data set, where the subset of data items is estimated to have a higher likelihood of being accessed. Since the working set cache contains a subset of the data from the full data set, it is smaller, and so when items can be retrieved from the cache rather than faulted in from the full data set, working set can be saved. In this way, working set caches or "working set saving caches" are typically created when they present a perceived benefit over accessing items from the full data set.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

While a working set cache can provide a memory savings benefit over directly accessing data from the full data set, such as if accessed data is sparsely located throughout the full data set, accessing items in the working set cache may be more computationally expensive than directly accessing the items in the full data set. Often, accessing items in the working set cache uses more machine cycles than accessing items from the full data set does, even when there is a cache hit. Cache lookups add overhead to a process regardless of whether there is a cache hit, and so are pure overhead when there is a cache miss. It is difficult to know, however, the magnitude of either the memory benefit or the computational cost when creating the working set cache. Its performance benefits and costs can usually not be determined until run-time.

The following disclosure is directed to efficiently determining whether the use of a working set cache provides a performance benefit and automatically deciding whether to use the cache. An effectiveness measurement is tracked over a period of time while the program runs. The effectiveness metric can include a precise understanding of the overhead of the working set cache and the benefit, if any, of memory savings the working set cache provides. If the effectiveness metric is on an ineffective side of a selected threshold amount, the working set cache is disabled. While the working set cache is disabled, items are directly accessed from the full data set. The working set cache can be re-enabled in response to a predetermined event.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
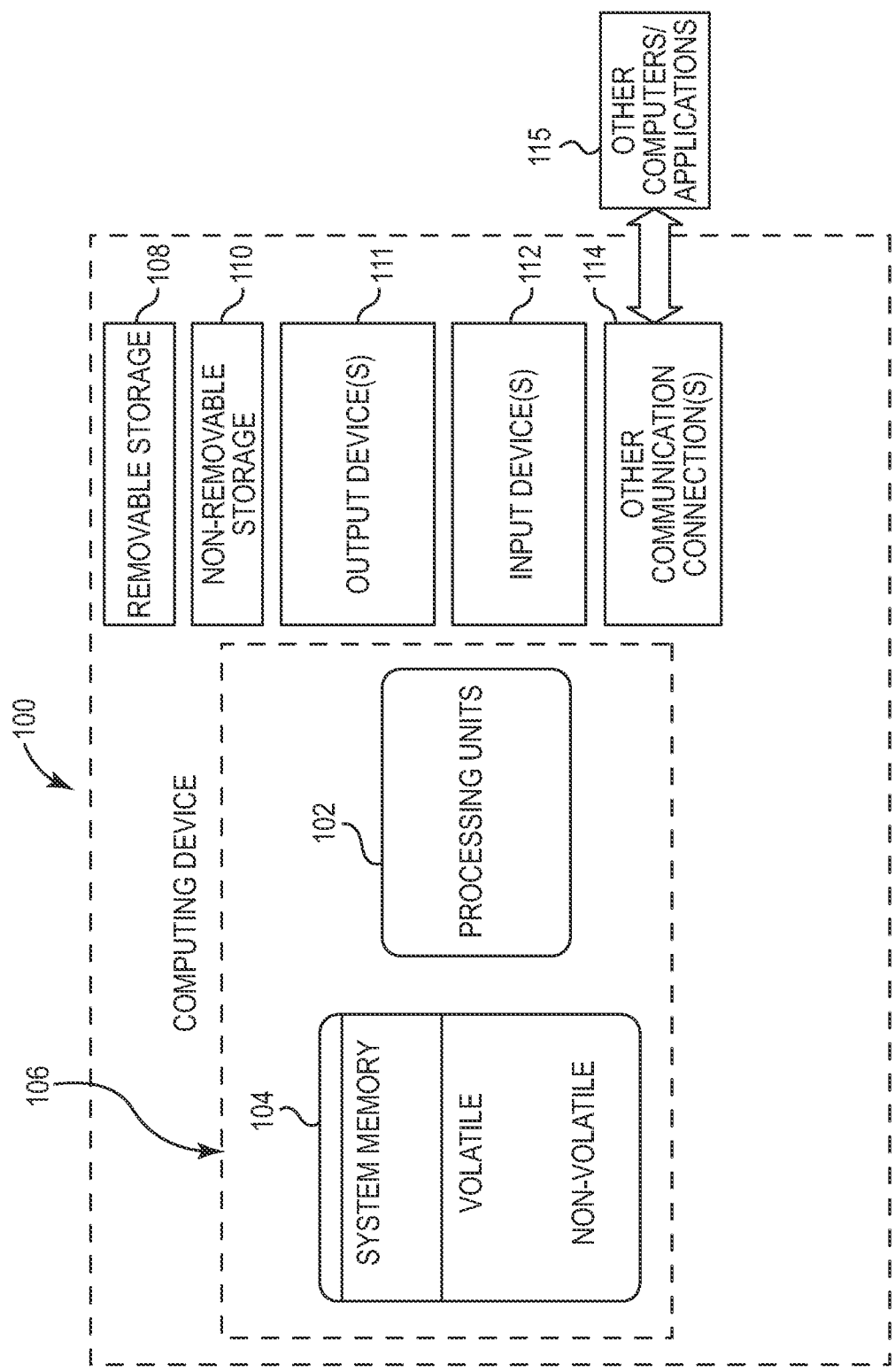
FIG. 1 is a block diagram illustrating an example of a computing device.

FIG. 1 illustrates an exemplary computer system that can be employed in an operating environment and used to host or run a computer application included on one or more computer readable transient storage mediums storing computer executable instructions for controlling the computer system, such as a computing device, to perform a method consistent with this disclosure.

The exemplary computer system includes a computing device, such as computing device 100. In a basic configuration, computing device 100 typically includes a processor system having one or more processing units, i.e., processors 102, and memory 104. By way of example, the processing units may include, but are not limited to, two or more processing cores on a chip or two or more processor chips. In many cases, processor 102 is referred to as a central processing unit, or CPU. In some examples, the computing device can also have one or more additional processing or specialized processors (not shown), such as a graphics processor for general-purpose computing on graphics processor units, or GPGPU, to perform processing functions offloaded from the processor 102. The memory 104 may be arranged in a hierarchy and may include one or more levels of cache. Depending on the configuration and type of computing device, memory 104 may be volatile (such as random access memory, or RAM), non-volatile (such as read only memory, or ROM, flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but be not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often include one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

The computing device 100 can be configured to run an operating system software program and one or more computer applications, which make up a system platform. A computer application configured to execute on the computing device 100 includes at least one process (or task), which is an executing program. Each process provides the resources to execute the program.

In one example, the computing device 100 includes a software component referred to as a managed environment. The managed environment can be included as part of the operating system or can be included later as a software download. Typically, the managed environment includes pre-coded solutions to common programming problems to aid software developers to create applications, such as software programs, to run in the managed environment. Examples of managed environments can include an application framework or platform available under the trade designation .NET Framework available from Microsoft Corporation of Redmond, Wash.

Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the in the address space of the process corresponding with the thread.

Figure 2:
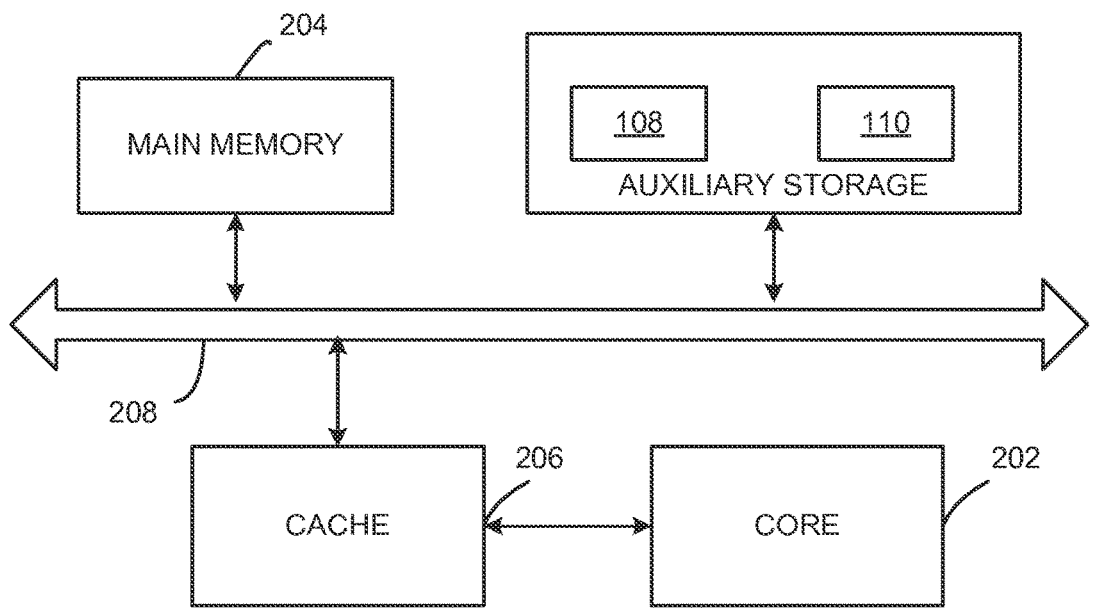
FIG. 2 is a block diagram illustrating an example of a memory hierarchy architecture that can be implemented in the computing device of FIG. 1.

FIG. 2 illustrates an example memory hierarchy 200 of computing device 100 arranged in a computer architecture that includes a processor core 202 (or CPU), a main memory 204, and a CPU cache 206 along with removable and non-removable storage 108, 110. The processor core 202 is not connected directly to main memory 204. Instead, loads and stores from the main memory 204 to the processor core 202 go through the CPU cache 206. In a simplified representation, the cache 206 is connected to the main memory 204 over a system bus 208 that is often also used to communicate with other components of the computer device 100 such as auxiliary storage, which can include the removable storage 108 and non-removable storage 110.

The operating system, or other program, typically includes memory management techniques to make efficient use of the memory hierarchy 200. An example memory management technique includes virtual memory. This technique virtualizes the various types of storage in the memory hierarchy 200, and allows a computer application to be designed to access data as if there was only one type of storage in the computer architecture, i.e., virtual memory. The virtual memory behaves as if it was directly accessible main memory 204.

Paging is often included as part of virtual memory implementation in many operating systems. A memory page, or page, is a fixed-length contiguous block of virtual memory that is a unit of data for memory allocation performed by the operating system for a program and transfer between main memory and any other auxiliary storage, such as a removable and non-removable storage 108, 110. In one example, a page is the smallest unit of memory allocation and data transfer. (Other example units of memory allocation are contemplated, but for clarity the examples below are discussed in terms of pages. The examples below can also be modified to include units of memory allocation that includes pages.) Through the use of paging, the physical address space of a process to be noncontiguous.

A page is used as the unit of information in the full data set. The full data set of information of a process is the collection of information referenced by the process while the process is running. For example, the full data set is suggested to be an approximation of the set of pages that the process will access. In one example, the full data set provides an indication of what pages ought to be kept in main memory to allow efficient progress to be made in the execution of that process. The choice of what pages to be kept in main memory—as distinct from being paged out to auxiliary storage—can affect the performance of the process. For example, if too many pages of a process are kept in main memory, fewer other processes can be ready at any one time. If too few pages of a process are kept in main memory, page fault frequency is greatly increased and the number of active (non-suspended) processes currently executing in the system approaches zero.

On a large full data set that is accessed sparsely, an operating system or other program will create a working set cache in main memory 204. The working set cache is configured to contain data from the full data set that the process "expects" to access. As in many other cache types, the process accesses or consults the working set cache before the process access the large full data set. Typically, the working set cache includes a subset of data from the full data set and is often organized more densely than the full data set. When accesses are found in the working set cache, fewer pages of memory are used than if the entire full data set was stored in main memory 204, which provides a benefit over attempting to directly access a large working set having items located across pages in virtual memory.

Dense organization of the data in the working set cache, however, makes direct access to the data difficult. Instead, memory management techniques are used to create a lookup table to access the data in the working set cache. The lookup table is consulted to determine whether the item is located in the working set cache and where the item is located in order to access the data. Consulting the lookup table, however, typically requires at least an order of magnitude more machine cycles to complete than directly accessing the data. If the item is determined to be located in the cache, accessing that item is much more expensive than direct access. If the item is determined not to be located in the cache, attempting to access the item creates purely additional overhead.

Attempting to predict whether the overhead is worth the expense is extremely difficult even for a particular program or particular execution of a program. The cost of the working set cache can typically only be known at run-time. Further, the benefit of even maintaining the working set cache is difficult to predict. In many circumstance, simply using a working set cache can introduce expense and other performance inefficiencies as compared to simply accessing the full data set. In such cases, the use of the working set cache creates a detriment to the process. Unfortunately, there is typically no foresight as to which of the items of the full data will be looked up and how often each item will be accessed. Without a method for determining the costs and benefits of using a working set cache, creating a working set cache amounts to guessing that it will benefit the process, and there is no way to avoid frequently guessing incorrectly.

Figure 3:
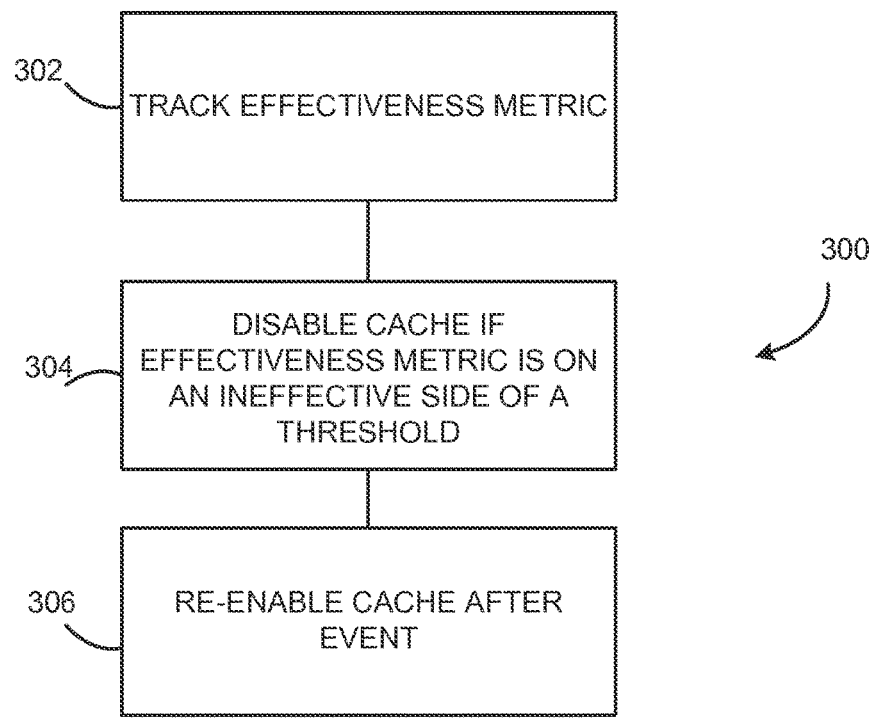
FIG. 3 is a block diagram illustrating an example method used during a process running on the computing device of FIG. 1 to determine whether a working set cache provides a benefit to the process.

FIG. 3 illustrates an example method 300 that can be used during the lifetime of a process to determine whether a working set cache provides a benefit to the process over accessing items directly from the full data set. Whenever a working set cache is created, the cache tracks an effectiveness metric at 302 and disables itself if the effectiveness metric is on an ineffective side of a threshold amount at 304. Additionally, the working set cache can re-enable itself after a predetermined event at 306. For example, the threshold can be a predetermined measurement amount that can be selected as an indication that using the cache provides a benefit despite its overhead. The threshold can also be determined either statically or dynamically based on a number of factors of the running program. In similar fashion, the predetermined event can include a fixed passage of time, or some other indicator that the process may benefit from the cache. In one implementation, a working set cache is created that monitors its own overhead and savings and decides when to turn itself off, i.e., an intelligent self-disabling working set cache with periodic re-enable.

An example of a traditional approach to implement a working set cache can be expressed as follows:

```
AssociatedData FullDataSet[TotalNumberOfElements];
// The full data set: an array of data elements indexed by an ID initially located only in virtual memory
    Dictionary<ID, AssociatedData> Cache;    // The cache of items expected to be looked up
    AssociatedData Lookup(ID)
    {
        if (cache.TryGetValue(ID, out data))
            return data;
        return FullDataSet[ID];
    }
```

The traditional approach, in the above example, involves a full data set of elements taken from virtual memory and a working set cache including a subset of data elements in the full data set. The working set cache is consulted for each access. If the data element is found in the working set cache, the data element is returned from the cache. When requested data elements are not found in the working set, the data elements are returned from the full data set. This traditional approach will always pay the cost of a cache lookup, which can typically increase overhead by several fold on a platform such as .NET Framework regardless of whether the working set cache provides a memory savings to the process.

Figure 4:
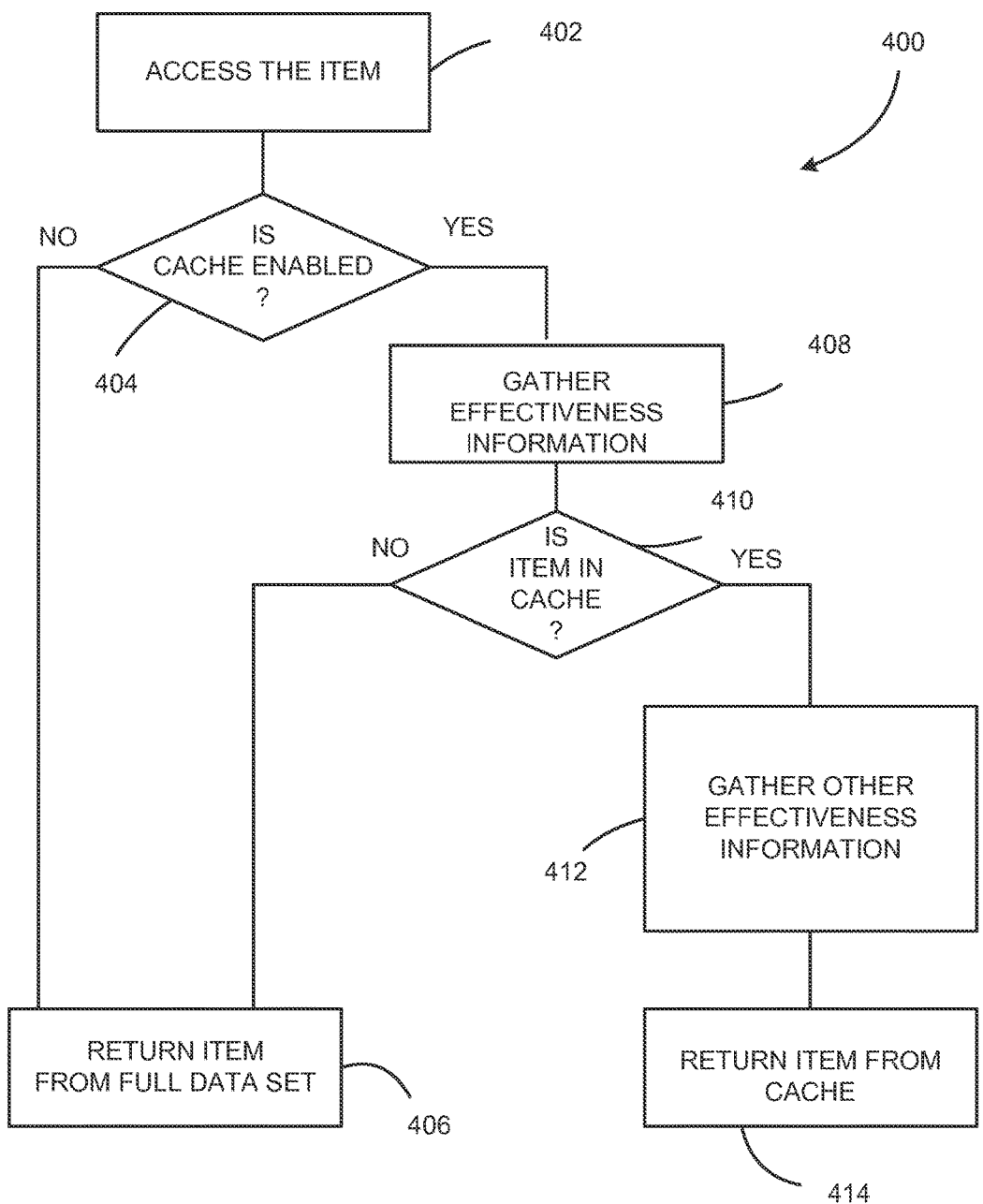
FIG. 4 is a flow diagram illustrating an example method of gathering information for the method of FIG. 3 while accessing data for the process.

In contrast, FIG. 4 illustrates an example lookup method 400 for use with the self-disabling working set cache having method 300. Instead of directly consulting the cache for data access at 402 as in the traditional approach, the self-disabling working set cache determines whether the cache is enabled at 404. If the cache is not enabled, the data is returned from the full data set at 406. If the cache is enabled at 404, information used to determine an effectiveness metric can be taken at 408. If the data is not in the cache at 410, the data is returned from the full data set at 406. If, however, the data is found in the working set cache at 410, another piece of information used to determine an effectiveness metric can be taken at 412. The type of information gathered at 408 and/or 412 depends on a selected policy heuristic.

Figure 5:
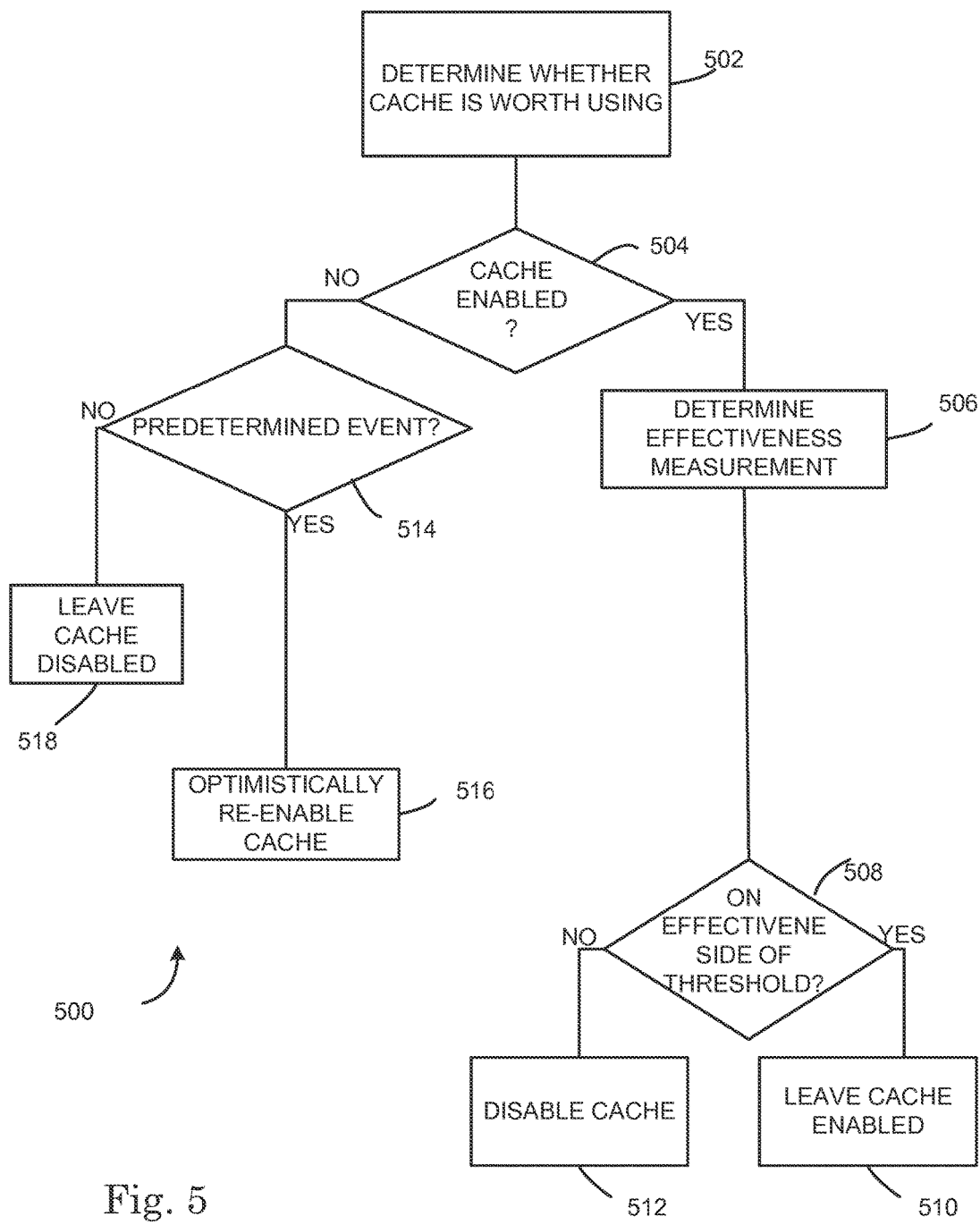
FIG. 5 is a flow diagram illustrating an example method of applying the gathered information to determine whether to disable a working set cache and re-enable a disabled working set cache in the example method of FIG. 3.

FIG. 5 illustrates a method 500 for making use of the information acquired for the effectiveness metric in method 400 to disable and re-enable the working set cache. From time to time, the method can be used to determine whether the working set cache provides a benefit at 502 over directly accessing the full data set. If the working set cache is enabled at 504, a determination is made as to whether the cache will remain enabled or whether it will be disabled. An effectiveness metric can be determined from the information acquired based on a selected policy heuristic at 506. If the effectiveness metric is determined to be on an effective side of a threshold amount at 508, the cache is left enabled at 510. If the effectiveness metric is determined to be on an ineffective side of the threshold amount at 508, however, the cache is disabled at 512.

If the cache is disabled at 504, a determination can be made as to whether the cache will remain disabled or whether it will be re-enabled. A determination is made as to whether a predetermined event has occurred at 514, such as the passage of a long enough time since the cache was disabled. If the predetermined event has occurred, the cache is optimistically re-enabled at 516 and information is again gathered to determine whether the cache provides a benefit. If, however, the predetermined event has not occurred the cache is left disabled at 518. Decisions 508 and 514 allow for flexibility in the policy heuristic used.

An example implementation of a self-disabling and re-enabling working set cache that incorporates features of methods 400 and 500 is expressed below:

```
AssociatedData FullDataSet[TotalNumberOfElements];
    // The full data set corresponds with an array of data elements
indexed by an ID initially located only in virtual memory
    Dictionary<ID, AssociatedData> Cache;
        // The cache of items expected to be looked up
    UInt64 LookupCount = 0;
    UInt64 HitCount = 0;
    BOOL ShouldUseCache = TRUE;
    AssociatedData Lookup(ID)
    {
        LookupCount = LookupCount + 1;
        if (ShouldUseCache && cache.TryGetValue(ID, out data))
        {
            HitCount = HitCount + 1;
            return data;
        }
        return FullDataSet[ID];
    }
    void PeriodicallyDecideWhetherToDisable( )
    {
        // HitCount and LookupCount are input to a policy heuristic to set
ShouldUseCache
```

```
    }
    void InfrequentlyOptimisticallyReenable( )
    {
        ShouldUseCache = TRUE;
    }
```

In the example, the hit rate of the working set cache is used as the effectiveness metric, and the cache will disable itself if an ineffective hit rate, e.g., a low hit rate, is detected. Information regarding the number of accesses to cache and the number of cache hits is acquired in LookupCount and HitCount when the cache is enabled, i.e., when ShouldUseCache is set to TRUE. In this example, incrementing LookupCount can correspond with 408 and incrementing HitCount can correspond with 412 of method 400. In one example of a policy heuristic, the ratio of HitCount to LookupCount is periodically compared against a selected hit rate set as the threshold amount of 508 of method 500. If the ratio is on the ineffective side of the threshold amount at 508, such as if the ratio is below the selected hit rate, the cache is disabled by setting ShouldUseCache from TRUE to FALSE. Other examples of using HitCount and LookupCount in a policy heuristic are contemplated.

The example allows provides for a disabled working set cache to re-enable itself at 514. In one example, the cache can be "optimistically" re-enable based on a predetermined event that does not based on an indication that the re-enabled cache will provide a benefit over directly accessing items from the full data set. If a determination is made to re-enable the working set cache, ShouldUseCache is set from FALSE to TRUE. The determination to re-enable a disabled cache can include a determination as to whether a selected amount of time has passed since the cache was disabled, whether a selected number of periodic instances the decision logic to re-enable the cache has been applied, or other measurement.

A low hit rate can be enough to determine that the working set cache can be disabled. But simply tracking hit rate, as in the above example, may not be enough to determine whether accesses returned from the working set cache provide a benefit. This can be better illustrated with reference to three cases using working set caches. In each of the three cases below, data items are returned from the working set cache on each access, i.e., the hit rate is 100% for illustration purposes. Just one out of the three cases, however, provides justification for using the working set cache.

In the first case, all of the table lookups are satisfied by the cache, and the accesses are for small items that would otherwise be located across the full data set such as in many different pages in the full data set. (In the extreme scenario, each item accessed is occupies one byte of a unique page of the full data set.) Use of the working set cache here provides a large benefit over direct access because fewer pages are loaded in main memory 204 when using the cache than if the pages of the full data set were to be loaded and/or access times from the working set cache may be improved over directly accessing data stored across the virtual memory.

In a second case, all of the table lookups are satisfied by the cache, but the accessed items are from just a few pages of the full data set. (In a worst case scenario, all of the items are located on the same memory page.) Direct access to the full data set is preferred here because the working set cache creates additional overhead without appreciably saving main memory 204.

In a third case, all of the lookups are satisfied by the cache and the accesses would be for items that would otherwise be located across the entire working set (like in the first case, which provides a large benefit) but many pages of the cache are already resident in the main memory 204. This case can occur when the accessed items are already in memory as the result of other processes used on the data or on other data located on the pages of the accessed items or for reasons related to the performance of the operating system. (In a worst case scenario, all of the pages are in the main memory 204 as a result of other processes, etc.) No benefit is provided from using a working set cache in this case.

In order to distinguish a beneficial working set cache from ones providing no benefit despite a high hit rate, the effectiveness metric can be influenced by determining an amount of memory being saved as a result of the working set cache. For example, the effectiveness metric can be influenced by amount of memory actually or approximately being saved compared to an amount of accesses.

An example implementation of tracking memory saved and accesses is described with reference to FIGS. 4 and 5. A lookup count is incremented at 408 for an access when the working set cache is enabled 404 regardless of whether the item is in the cache. If the item is in the cache, the location of the item in the full data set is recorded, i.e., the page that would have been accessed were it not for the presence of the cache. For example, if the item is in the cache at 410, a flag or other notation can be made as to the page including the address of the item from the full data set at 412. In one example, a record is made of unique flagged pages and not a total amount of pages accessed. The number of unique flagged pages can also be tracked because this number multiplied by the page size in terms of memory units can be used to determine an amount of memory saved.

The lookup count and the amount of flagged pages and/or the location of these flagged pages can be input into a policy heuristic at 506 to determine the effectiveness metric. For example, an amount of flagged pages relatively close to the lookup count with a relatively high amount of memory saved suggests the working set cache is approaching the first case and thus provides a large benefit. In contrast, an amount of flagged pages much lower than the lookup count with a relatively low amount of memory saved suggests the working set cache is approaching the second case and thus provides little or no benefit. In one example the effectiveness metric is expressed in terms of lookups and memory saved in memory units, e.g., one million lookups and five megabytes saved. The particular policy heuristic of 506 and threshold amount used in 508 can be based on this information along with information on how much main memory 204 is available and other factors specific to the system used and the particular process.

An additional piece of information used to influence the effectiveness metric includes whether the flagged pages are already in main memory 204 as a result of being part of the data set of another process or other reason. This information can be gathered by querying the operating system or other program at 506 to determine if the pages are already in main memory. The policy heuristic and threshold amount can be configured to consider this information in determining effectiveness. For example, an amount of flagged pages relatively close to the lookup count with a relatively high amount of memory saved—but where many of the flagged pages are already in main memory—suggests the working set cache is approaching the third case and thus provides no benefit.

In one example, the amount of the working set cache already in the memory can be subtracted from amount of memory saved to determine a new amount of memory saved as part of the policy heuristic. In one example, the amount of pages already in the memory can be subtracted from the amount of flagged pages, and this difference is multiplied by the page size to determine how much memory is being saved in order to determine the effectiveness metric. The threshold amount can be chosen to account for this.

An example implementation of a self-disabling and re-enabling working set cache that incorporates features of methods 400 and 500, which considers locality of the items in making an effectiveness metric is expressed below:

```
AssociatedData FullDataSet[TotalNumberOfElements];
// The full data set: an array of data elements indexed by an ID
initially located only in virtual memory
    Dictionary<ID, AssociatedData> Cache;       // The cache of items
expected to be looked up
    UInt64 lookupCount = 0;
    BOOL
PageWouldHaveBeenTouched[TotalNumberOfElements/
NumberOfElementsPerPage];
    BOOL ShouldUseCache = TRUE;
    AssociatedData Lookup(ID)
    {
        LookupCount = LookupCount + 1;
        if (ShouldUseCache && cache.TryGetValue(ID, out data))
        {
            PageWouldHaveBeenTouched[(ID * ElementSize) >>
OS_PAGE_SIZE_BIT_SHIFT] = TRUE;
            return data;
        }
        return FullDataSet[ID];
    }
    void PeriodicallyDecideWhetherToDisable( )
    {
        //scan PagesWouldHaveBeenTouched array for TRUE elements;
        //query operating system and use policy heuristic;
        //query random sample to reduce overhead
    }
    void InfrequentlyOptimisticallyReenable( )
    {
        ShouldUseCache = TRUE;
    }
```

The example implementation includes a counter and one element-per-page array. Through the use of the counter and the array, the cache can efficiently track how much overhead it adds to the process and how many pages of the full data set it avoids touching. By correlating that array with working set information provided by the operating system when making the periodic decision, a determination can be made as to how much benefit it provides. To determine how many pages of the full data set have been saved in this implementation, the PageWouldHaveBeenTouched array is scanned for TRUE elements. The amount of TRUE elements can be multiplied by page size to determine the amount of memory in units of memory size are saved. For example, the operating system is queried to determine whether the pages corresponding with the TRUE elements are already occupying physical memory (i.e., in working set). Pages that correspond with the TRUE elements have been successfully saved by the use of the working set cache. Querying the operating system may in some cases add undesirable overhead depending on the circumstances. Rather than querying the operating system for every TRUE element, the operating system can be queried for a random sample of TRUE elements. The number of pages not in the working set can then be multiplied by the percentage of TRUE elements and used in the definition. This will reduce or bound overhead caused by querying the operating set.

This example enables full differentiation between the best-case scenario and the worst-case scenarios described above with negligible measurable added overhead. During testing, examples constructed in the .NET Framework brought the performances of the worst-case scenario to having barely any measurable overhead while still allowing the full benefit of the best-case scenario.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of determining whether a working set cache provides a selected performance benefit for a process:
    tracking an effectiveness metric of the working set cache, the working set cache created by a program and stored in a main memory of a computing device having a central processor and a central processor cache disposed between the central processor and the main memory, so that loads and stores from/to the main memory to/from the central processor go through the central processor cache, tracking the effectiveness metric including determining the effectiveness metric based on an amount of pages of memory not loaded in the main memory as a result of the working set cache;
    disabling the working set cache if the effectiveness metric is on an ineffective side of a selected threshold amount; and
    enabling the working set cache, after the working set cache has been disabled, in response to a predetermined event.

2. The method of claim 1 wherein the working set cache includes a subset of a full data set stored in virtual memory.

3. The method of claim 2 wherein the full data set includes pages in auxiliary memory.

4. The method of claim 1 wherein the effectiveness metric is influenced by an amount of accesses of the working set cache by the process.

5. The method of claim 1 wherein tracking the effectiveness metric includes gathering information for each access of the working set cache.

6. The method of claim 1 wherein tracking the effectiveness metric includes gathering information after each working set cache hit.

7. The method of claim 6 wherein information gathered in tracking the effectiveness metric is applied in a policy heuristic to determine the effectiveness metric.

8. The method of claim 1 wherein the selected threshold amount is a predetermined threshold amount.

9. The method of claim 1 wherein the predetermined event includes a fixed passage of time.

10. A computer readable storage device, which does not include transitory propagating signals, storing computer-executable instructions for controlling a computing device to perform a method comprising:
    tracking an effectiveness metric of a working set cache created by a program and stored in a main memory of the computing device, the computing device having a central processor and a central processor cache disposed between the central processor and the main memory, so that loads and stores from/to the main memory to/from the central processor go through the central processor cache, tracking the effectiveness metric including determining the effectiveness metric based on an amount of pages of memory not loaded in the main memory as a result of the working set cache;
    disabling the working set cache if the effectiveness metric is on an ineffective side of a selected threshold amount; and
    enabling the working set cache, after the working set cache has been disabled, in response to a predetermined event.

11. The computer readable storage device of claim 10 wherein the working set cache includes a subset of a full data set stored in virtual memory.

12. The computer readable storage device of claim 11 wherein the full data set includes pages in auxiliary memory.

13. The computer readable storage device of claim 10 wherein the effectiveness metric is influenced by an amount of accesses of the working set cache by a process.

14. The computer readable storage device of claim 10 wherein tracking the effectiveness metric includes gathering information for each access of the working set cache.

15. The computer readable storage device of claim 10 wherein tracking the effectiveness metric includes gathering information after each working set cache hit.

16. The computer readable storage device of claim 15 wherein information gathered in tracking the effectiveness metric is applied in a policy heuristic to determine the effectiveness metric.

17. The computer readable storage device of claim 10 wherein the selected threshold amount is a predetermined threshold amount.

18. The computer readable storage device of claim 10 wherein the predetermined event includes a predetermined passage of time.

19. A system comprising:
    a central processor;
    a main memory to store computer-executable instructions and a working set cache created by the computer-executable instructions controlling the central processor;
    a central processor cache disposed between the central processor and the main memory, so that loads and stores from/to the main memory to/from the central processor go through the central processor cache;
    the computer-executable instructions controlling the central processor to:
        track an effectiveness metric of the working set cache based on an amount of pages of memory not loaded in the main memory as a result of the working set cache;
        disable the working set cache if the effectiveness metric is on an ineffective side of a selected threshold amount; and
        enable the working set cache, after the working set cache has been disabled, in response to a predetermined event.

* * * * *